United States Patent [19]

Lee, II

[11] Patent Number: 5,007,454
[45] Date of Patent: Apr. 16, 1991

[54] FLUID CONTROL VALVE WITH TUBULAR POPPET

[75] Inventor: Leighton Lee, II, Guilford, Conn.

[73] Assignee: The Lee Company, Westbrook, Conn.

[21] Appl. No.: 410,653

[22] Filed: Sep. 21, 1989

[51] Int. Cl.$^5$ .............................................. F16K 15/08
[52] U.S. Cl. ................................ 137/508; 137/516.15; 137/625.38
[58] Field of Search ................ 137/508, 512.1, 516.15, 137/516.17, 516.19, 516.21, 516.23, 540, 625.38

[56] References Cited

U.S. PATENT DOCUMENTS

| | | | |
|---|---|---|---|
| 556,023 | 3/1896 | Pew | 137/516.15 |
| 643,117 | 2/1900 | Fromberger | 137/540 X |
| 795,999 | 8/1905 | Mueller | 137/516.23 |
| 4,026,322 | 5/1977 | Thomas | 137/540 X |
| 4,140,148 | 2/1979 | Richter | 137/540 X |
| 4,766,924 | 8/1988 | Lee et al. | 137/540 X |
| 4,766,930 | 8/1988 | Patti | 137/540 |

Primary Examiner—Stephen M. Hepperle
Attorney, Agent, or Firm—Philip J. Lee

[57] ABSTRACT

A fluid control valve comprises a slidable, tubular poppet member that is biased toward and sealingly engages dual concentric annular valve seats, which valve seats define an annular opening through which the fluid medium flows when the valve is open. When the system pressure reaches a threshold pressure the poppet member is axially displaced from the valve seats such that an annular orifice is opened between the inside edge of the poppet and the inside valve seat and another orifice is formed between the outside edge of the poppet and the outside valve seat through which orifices the fluid medium flows into a central, axially extending relief path partially defined by the inside of the poppet. The dual orifices allow the valve to open with a stroke that is about one-half that of that required in a valve with only one orifice and similar operating range.

20 Claims, 4 Drawing Sheets

FLUID CONTROL VALVE WITH TUBULAR POPPET

BACKGROUND OF THE INVENTION

A. Field of Invention

The present invention relates generally to fluid control valves and more particularly to valves used to control the pressure and/or flow direction of the fluid medium in hydraulic or pneumatic systems.

B. Description of Related Art

Direct acting pressure relief valves are available which employ a ball or a cross-sectionally circular poppet that is biased into sealing engagement with a valve seat surrounding the opening to a central flow passage, thereby preventing flow through the valve until and unless the pressure of the fluid medium exceeds a threshold level and then allowing flow in only one direction. When the force exerted by the pressure of the fluid medium on the ball or poppet exceeds the force exerted by the biasing means, the ball or poppet is disengaged from its seal with the valve seat which allows flow through the valve, thereby relieving and reducing the pressure within the system. The displacement of the ball or poppet from the valve seat results in the opening of a single orifice, typically annular, defined by the gap between the opposing surfaces of the ball or poppet and the valve seat. In the conventional direct acting pressure relief valve, the flow path of the open valve proceeds axially through the central flow passage, through the annular orifice between the ball or poppet and the valve seat, radially outward and around the ball or poppet and, in some configurations, thence radially inward into and then axially downstream through a central exit flow passage, typically the interior bore of the poppet. When the force exerted by the pressure of the fluid medium in the system is reduced to less than the force exerted by the biasing means, the ball or poppet returns to a sealing engagement with the valve seat and the valve closes. In the conventional pressure relief valves of this type compromises must be made in at least one of the following variables: the size of the assembled valve, the flow capacity through the valve, or the valve response characteristics, most commonly the valve hysteresis on opening or closing.

Commonly, in miniature axial flow valves for use in high pressure applications, acceptable rates of flow through the valve are achieved at the cost of relatively high closing hysteresis. The flow capacity of such valves is dependent upon the inside dimension of the central exit flow passage which must have a cross-sectional area in excess of that of the inlet flow passage at the valve seat to provide an adequate pressure differential across the valve. Since the outside dimension of the poppet must be greater than the inside dimension, such valves are characterized by a significant difference between the outside dimension of the poppet and the inside cross-sectional area of the inlet flow passage and the valve seat. In a valve of this configuration, the valve when open exposes to the inlet pressure of the fluid medium a greater area of the transverse aspect of the poppet surface than is exposed when the valve is closed, thereby increasing the speed at which the valve opens but conversely also tending to slow the closing of the valve by holding the valve open after the fluid pressure returns to a level below the cracking pressure. The increased transverse surface of the conventional poppet exposed to the inlet pressure on opening, may also cause instability under conditions where the flow rate is not adequate to sustain the valve in an open state.

Spring constraints are also common limitations in miniature valves that are required to maintain high flow capacities while subject to length and width restrictions, particularly when the valve must be inserted into the bore of the system. In such valves, the common poppet biasing means are springs and, in addition to the flow restraints imposed by the diameter of the valve, another primary size constraint is imposed by the size of the spring required for the desired application. Generally, shorter springs with higher spring rates can be used when the axial displacement of the poppet required to open the valve is shortened. In conventional direct acting relief valves, limitations shortening the stroke of the poppet are accommodated by increasing the diameter of the poppet to avoid decreasing the flow capacity of the valve when open. When the conventional valve is fully open, the stroke distance approximately equals the transverse area of the inlet flow passage divided by the circumference of the inlet flow passage. Consequently, in conventional direct acting valves, the stroke, and thereby the spring length, are ordinarily directly dependent upon the inside diameter of the inlet flow passage which in turn determines the flow capacity of the valve. The stroke and spring length determine the length of the valve body. Therefore, conventional single orifice valves are strictly limited by maximum ratios of flow capacity to valve size, and, particularly in aerospace applications where minimum size is essential, the challenge is to increase that ratio.

SUMMARY OF THE INVENTION

The invention herein described is a direct acting valve which is of a generally cylindrical shape with an axial flow path and which is suitable for insertion into a bore. A central flow path through the inlet end of the valve allows the fluid medium to enter the valve. The central flow path communicates through a plurality of axially extending bores with an annular chamber that is coaxial with the central flow path and the valve in general. The outlet end of the annular chamber is open and the edges of the annular opening of the chamber form dual concentric valve seats. When the valve is closed, the annular opening of the chamber is sealed by the engagement of the upstream end of a tubular poppet with the valve seats. The poppet is generally slidingly disposed within the body of the valve and axially displaceable from the valve seats. The separation between the valve seats is slightly less than the thickness of the poppet wall and the inside edge of the poppet wall sealingly engages the inside valve seat while the outside edge of the poppet wall sealingly engages the outside valve seat. Either the inside and outside edges of the upstream end of the poppet, or the edges of the valve seats, or both may be chamfered to provide a tight seal when the valve is closed. The poppet is biased by a helical closure spring against the valve seats to prevent the flow of fluid through the valve. Upon the displacement of the poppet from the valve seats, flow occurs through one annular orifice formed by the gap between the outside valve seat and the outside edge of the upstream end of the poppet as well as through another annular orifice formed by the gap between the inside valve seat and the inside edge of the upstream end of the poppet. At a location immediately downstream of the valve seats, the inside diameter of the valve body is enlarged to allow the fluid medium to flow around and past the outside surface of the upstream end of the poppet. A pluralitY of orifices through the wall of the poppet allow the fluid medium to flow from the outside of the poppet into the central bore defined by the inside diameter of the tubular poppet. From the central bore of the poppet, the fluid medium continues downstream through a central flow passage defined successively by the inside diameters of the helical closure spring and a retaining lug that retains the spring.

When the system pressure is less than a predetermined threshold, the poppet sealingly engages both the inside valve seat and the outside valve seat to prevent flow through the valve. When the system pressure exceeds the predetermined threshold pressure, the poppet is axially displaced in a downstream direction from the valve seats and the valve opens. When the system pressure is sufficiently relieved and reduced by the flow of the fluid medium through the open valve, the force of the closure spring biases the poppet into sealing engagement with the valve seats and the valve closes.

Since two orifices are opened between the valve seats and poppet when the valve opens, the poppet is required to travel less than the distance required in a conventional valve using only one orifice, while achieving the same flow capacity. The shorter opening stroke of the present valve allows the use of a shorter spring with a higher spring rate than would be possible otherwise.

Due to the tubular configuration of the poppet, a portion of the fluid medium can flow directly into the inside of the poppet without first flowing around the outside diameter, and a reduced resistance to flow is thereby achieved. In addition, the poppet has little transverse area in excess of the area of the opening of the annular chamber formed by separation of the two valve seats. Since the transverse area of the poppet that is exposed to the inlet pressure after cracking is not significantly greater than that exposed to the inlet pressure before opening, reduced hysteresis is seen when the valve closes.

Accordingly, the valve of the present invention is designed in recognition of the fact that in applications where a full poppet stroke is not available, the factor limiting flow capacity in a conventional valve is not the internal dimension of the opening of the relief bore, but is rather the area of the annular orifice treated by the gap between the poppet and the valve seat. By utilizing a tubular poppet the valve of the present invention nearly doubles the flow capacity of the valve for a given valve stroke and minimizes the constraints on the valve stroke as a limitation of flow capacity. Stated differently, other variables being relatively equal, for a conventional valve to open as quickly as the valve of the present invention, upon a given pressure increase, the spring rate of the conventional valve's spring would have to be one-half that of the valve of the present invention. Another benefit of minimizing the aspect of the poppet that is transverse to the flow path is that upon opening the poppet itself presents minimal resistance to flow through the valve due also to the minimal radial distortion of the flow path.

The valve body may be comprised of three parts, one of which contains the closure spring and another contains and guides the poppet and the other part forms the valve seat assembly. The parts of the valve body are joined during assembly after insertion of the poppet and spring. The spring containing part can be joined to the rest of the valve such that disassembly is possible without removal of the valve from the bore in which it is installed. The poppet and closure spring are retained within the valve body by a retainer lug which threadably engages the interior of the downstream end of the valve body. The retainer lug has a central opening providing a flow passage and can be removed for inspection of the poppet and spring and can be axially positioned to adjust the force of the closure spring on the poppet.

Variations can be made in the force of the closure spring to alter the operational characteristics of the valve including the threshold pressure.

The principal aim of the present invention is to provide a new and improved pressure relief or check valve in which a high flow capacity is achieved with a short opening stroke requiring less poppet travel and allowing the valve to fully open in a short time, and in which hysteresis is minimized at closing pressure.

Another and further object and aim of the present invention is to provide a new and improved pressure relief valve wherein the poppet is biased by a short, stiff spring.

Another and further object and aim of the present invention is to provide a new and improved pressure relief valve wherein resistance to flow through the valve is minimized.

Other objects and advantages of the invention will become apparent from the Description of the Preferred Embodiments and the Drawings.

DESCRIPTION OF THE PREFERRED EMBODIMENT(S)

Figure 1:
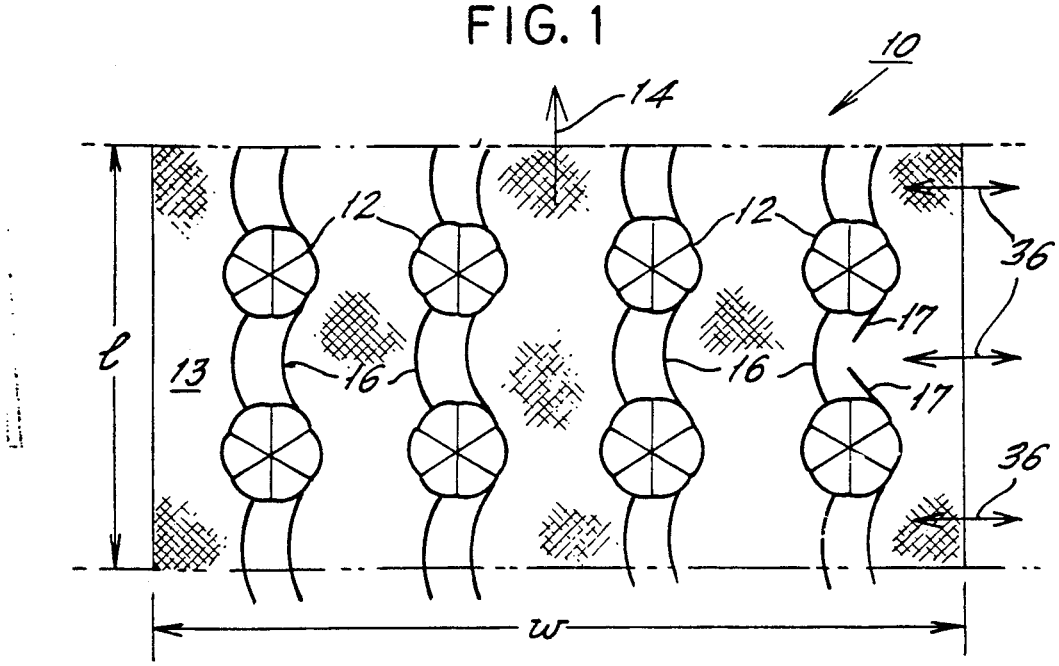
FIG. 1 is an axial sectional view of a valve in accordance with the present invention, said valve being illustrated in a closed position.
Figure 2:
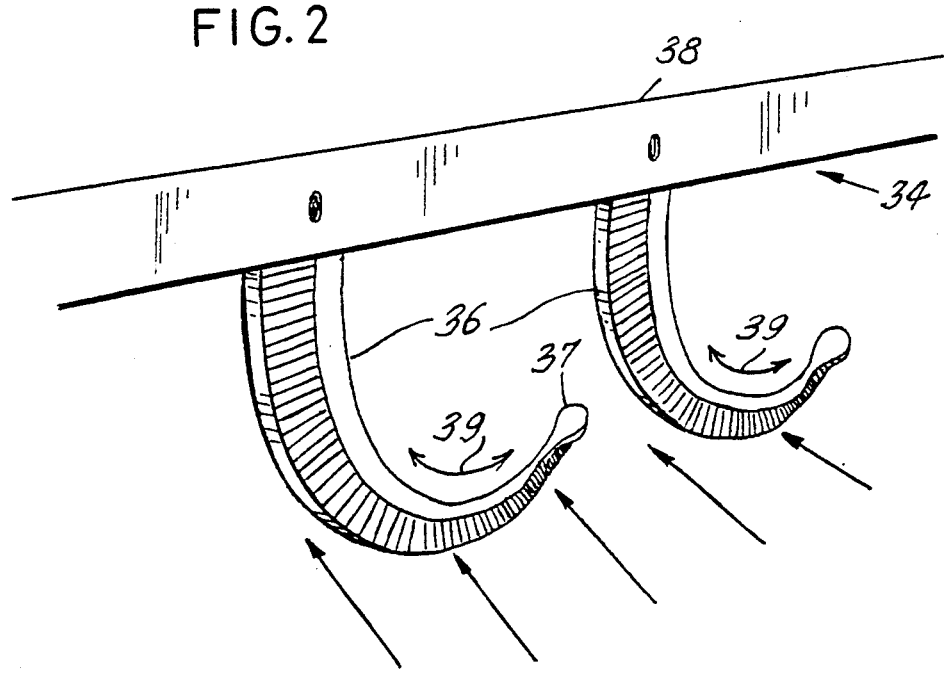
FIG. 2 is an axial sectional view of a valve in accordance with the present invention, said valve being illustrated in an open position.
Figure 2:
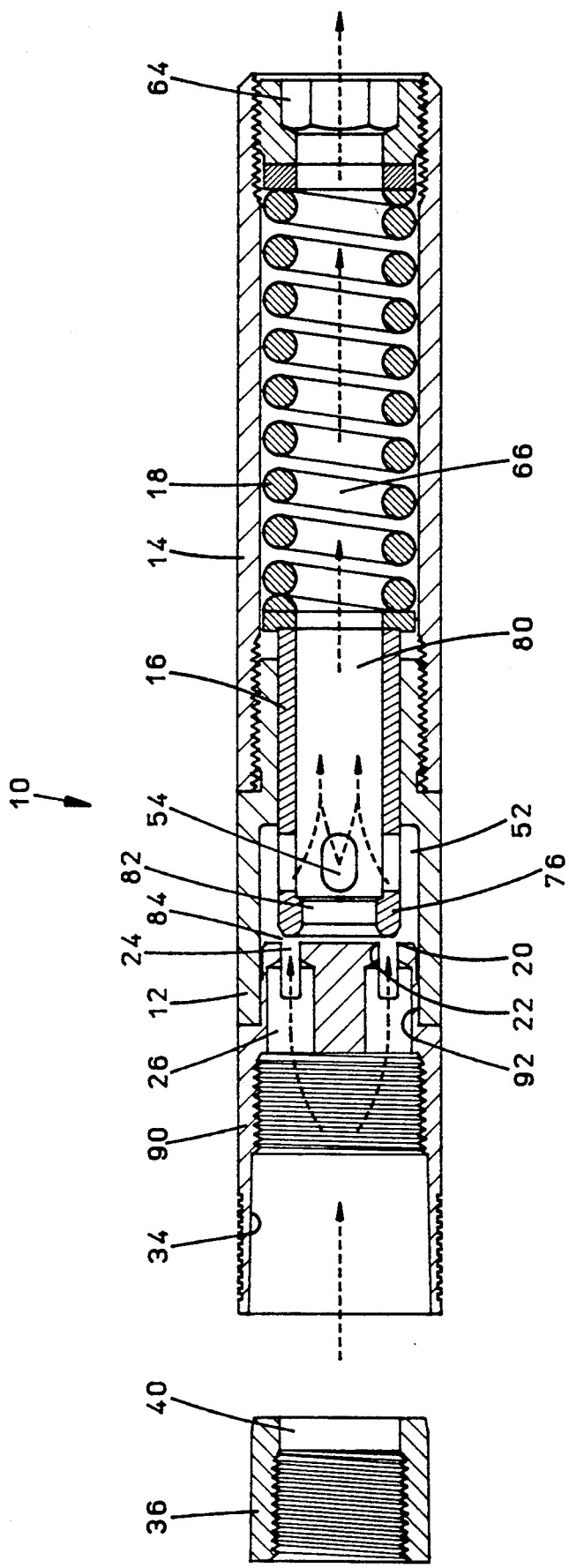
Figure 4:
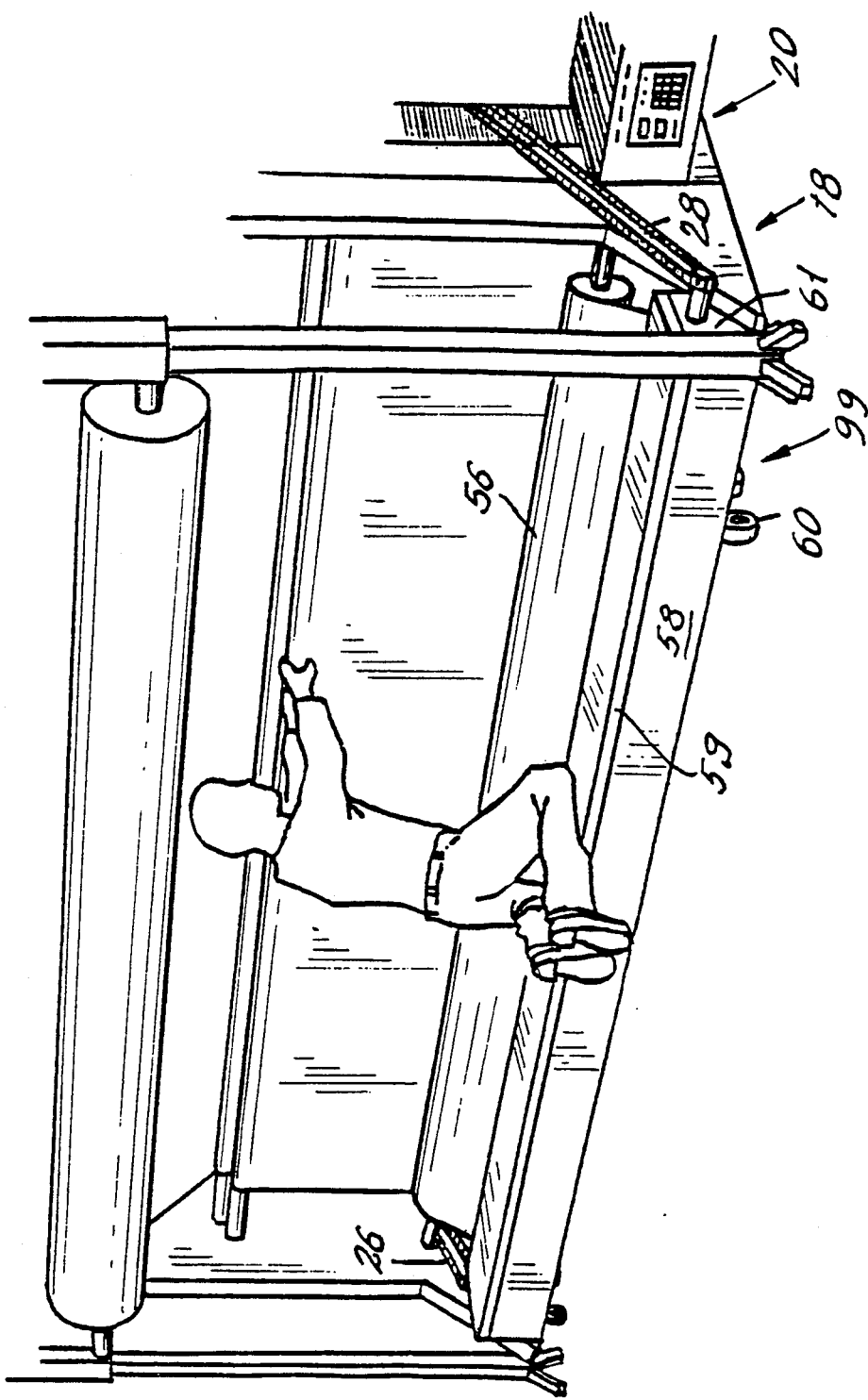
FIG. 4 is an enlarged axial sectional view of a portion of a pressure relief valve in accordance with the present invention, illustrating the valve seat and poppet detail.
Figure 4:
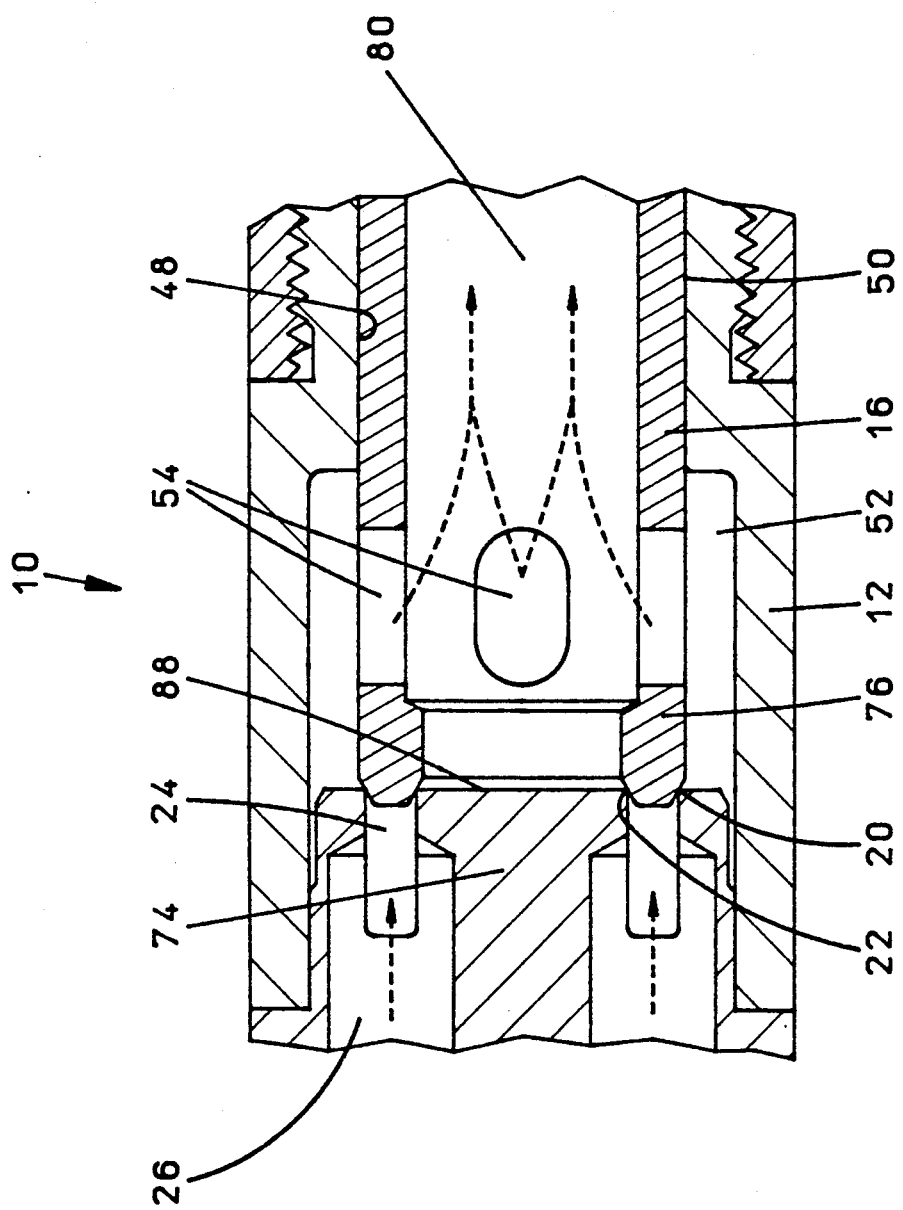
Figure 1:
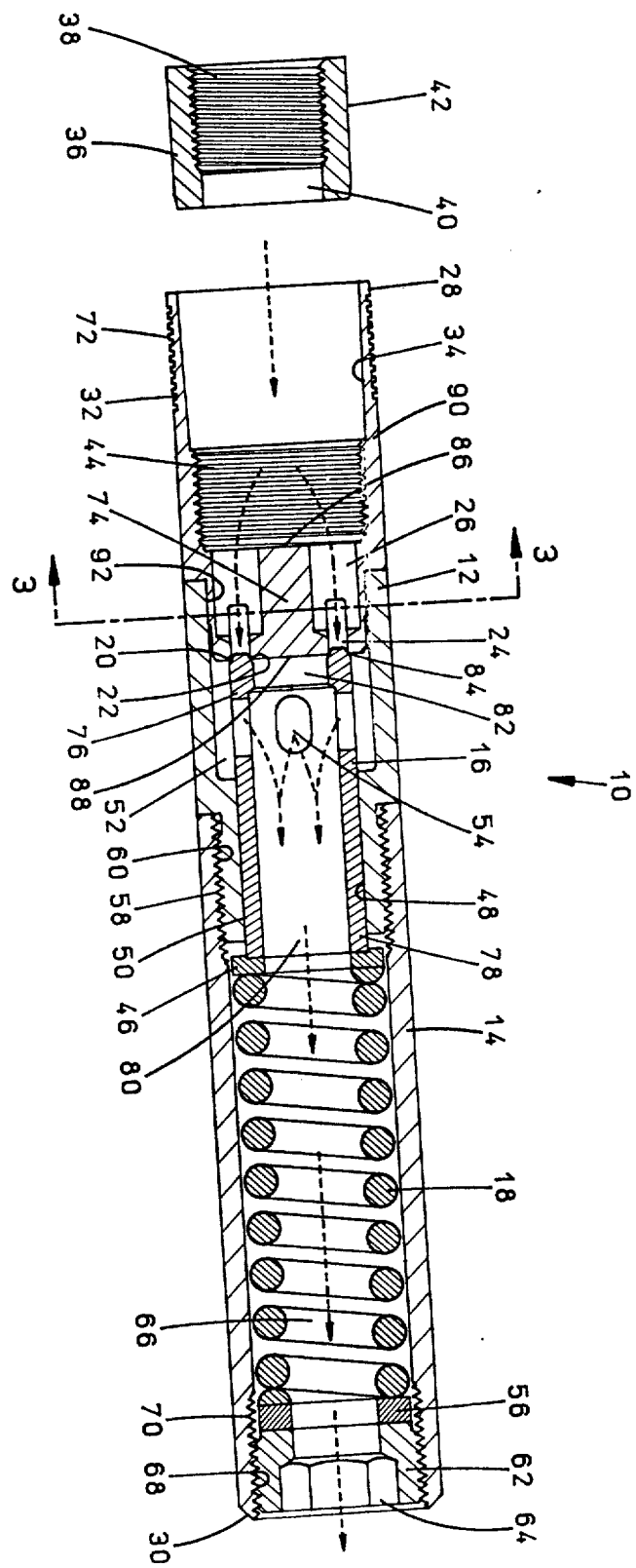
Figure 2:
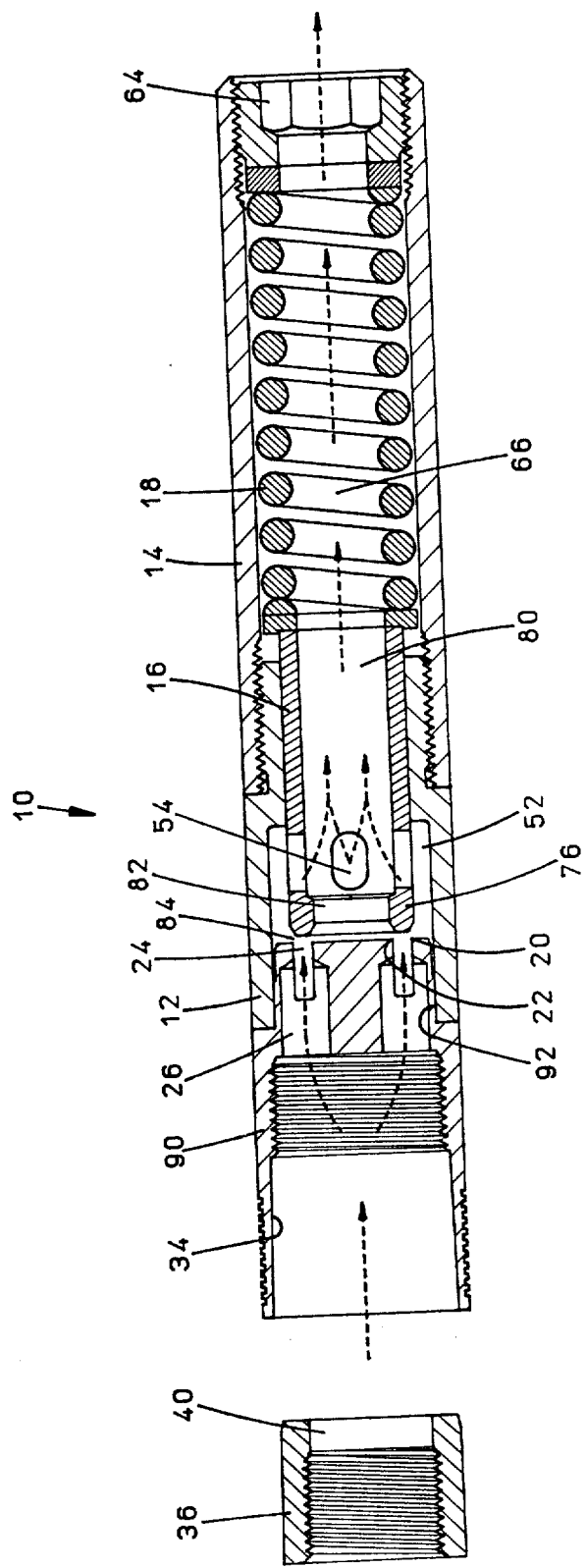
Figure 3:
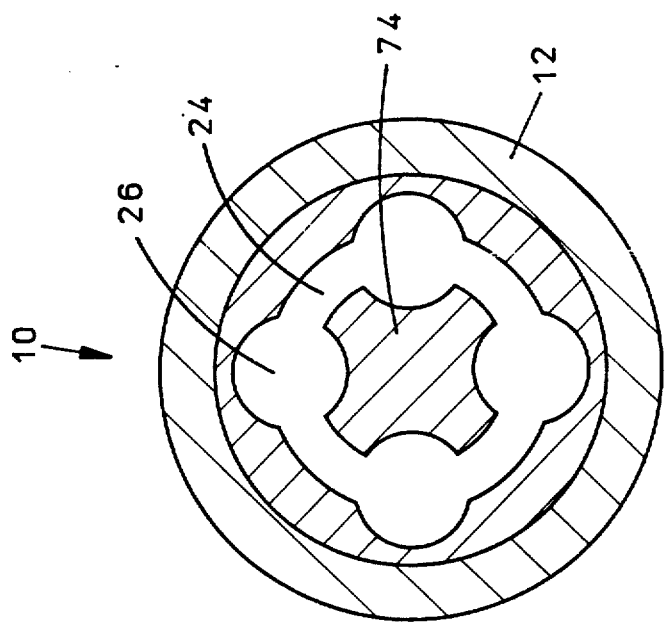
FIG. 3 is a cross sectional view of a valve in accordance with the present invention, taken along line 3—3 shown in FIG. 1.
Figure 4:
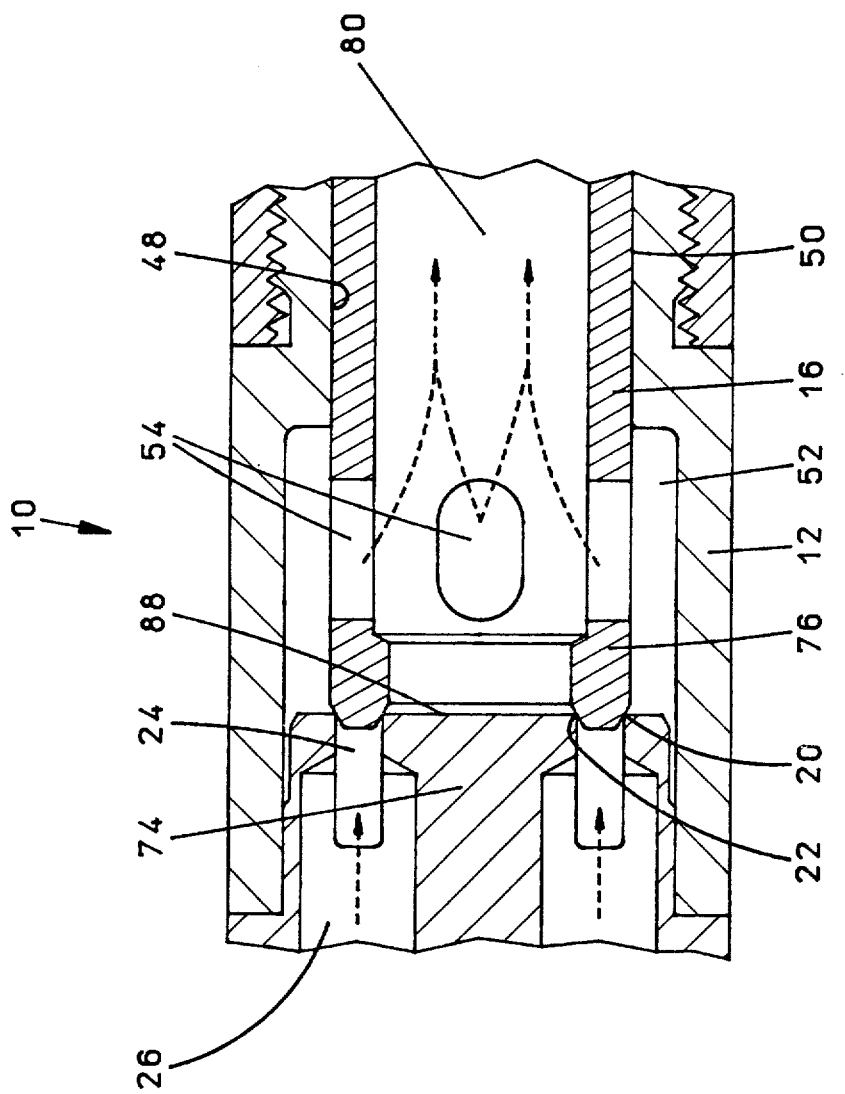

With reference to the drawings wherein like numerals represent like parts throughout the figures, a valve in accordance with the present invention is generally designated in FIG. 1 by the numeral 10. Valve 10 is specially adapted to regulate pressure in a fluid system by opening and closing at a pre-established threshold pressure to thereby release excess pressure to a relief outlet. Valve 10 is of a compact, miniaturized form and is adapted to be mounted in position in a fluid conduit (not illustrated) of a hydraulic or pneumatic system. Valve 10 is inserted into an installation bore (not illustrated) and secured in a fixed position therein. The direction of the flow of through the fluid passageway formed by the valve 10 is generally designated by the broken arrow of FIG. 1 illustrating the directional flow path subsequent to the opening of valve 10.

In the embodiment illustrated in FIG. 1, the valve 10 has an upstream end 28 and a downstream end 30 and comprises an inlet housing section 90, a poppet guide section 12 and an outlet housing section 14 all of which are generally cylindrically shaped. The poppet guide section 12 and outlet housing section 14 are joined by the engagement of male threads 60 formed on the exterior surface of the downstream end of the poppet guide section 12 with female threads 58 formed on the interior surface of the upstream end of the outlet housing section 14. The poppet guide section 12 interiorly receives the valve assembly and partially defines the relief path through the valve 10. The inlet housing section 90 is press fitted and welded to the poppet guide section 12 and includes a transverse portion 74 which forms the valve seat assembly. In the embodiment illustrated in FIG. 1, the inlet housing section 90 forms an exterior mounting surface 72 and a tapered inlet bore 34. The exterior mounting surface 72 forcefully engages the wall of an installation bore to securely mount the valve 10 in position in the fluid system. A plurality of circumferentially extending axially spaced grooves 32 traverse the exterior mounting surface 72 to form alternating axially spaced sealing lands and grooves. The valve 10 is mounted in a fluid conduit by inserting the valve body into an installation bore. A pin 36 with a tapered pin surface 42 is inserted into the tapered inlet bore 34. The tapered pin 36 and the tapered inlet bore 34 are dimensioned so that as the tapered pin 36 is forcefully, axially driven into the tapered inlet bore 34 (to the right in FIG. 1) toward the outlet end 30, the tapered pin 36 forces the inlet end 28 of the inlet housing section 12 to controllably radially expand to thereby force the said lands to sealingly engage the surrounding wall of the installation bore of the fluid conduit. The edges of the lands bite into the surrounding material of the installation bore to form independent seals and retaining rings with the installation bore. A central pin bore 40 extends axially through the tapered pin 36 to function as an inlet fluid passageway when the valve 10 is mounted in position. The tapered pin 36 is partially interiorly threaded to provide pin retraction threads 38 for the insertion and fastening of a threaded removal tool (not shown) used to extract the tapered pin 36 from the valve 10 and the tapered inlet bore 34 is partially interiorly threaded to provide valve retraction threads 44 for the insertion and fastening of a threaded removal tool (not shown) used to extract the valve 10 from the installation bore.

In the preferred embodiment illustrated in FIG. 1, the inlet housing section 90 includes a transverse portion 74 that has an upstream surface 86 and a downstream surface 88. Transverse portion 74 defines four equiangularly displaced bores 26 that axially extend in a downstream direction from the upstream surface 86 and an annular chamber 24 that is coaxial with the inlet housing section 90 and valve 10 and which intersects the downstream ends of the bores 26 to communicate with and connect the bores 26. Annular chamber 24 has a downstream end comprising an annular opening 84 in the downstream surface 88 of the transverse portion 74. The inside and outside walls of annular chamber 24 are generally cylindrical and coaxial with the inlet housing section 90 and with valve 10. The annular chamber 24 communicates through annular opening 84 with a relief chamber 52 formed by the enlargement of the inside diameter of the poppet guide section 12 located immediately downstream of the downstream surface 88 of the transverse portion 74. Relief chamber 52 is formed in part by a cylindrical interior wall of poppet guide section 12 that is coaxial with the valve 10 and poppet 16 and has a inside radius that exceeds the outside radius of the poppet 16 by a distance approximately equal to the distance the poppet travels to completely open the valve 10. The edges of the annular opening 84 form dual concentric valve seats 20 and 22, valve seat 20 being radially outside of valve seat 22. The radially exterior surface 92 of the downstream end of transverse section 74 of inlet housing section 90 has an outside diameter approximately equal to the inside diameter of the upstream end of poppet guide section 12 providing a pressure fit. The downstream end of radially exterior surface 92 is of reduced outside diameter, being undercut to create a clearance between the outside diameter of the downstream end of transverse section 74 and the inside surface of the poppet guide section 12 to prevent pressure fit induced distortion of valve seats 20 and 22.

The valve assembly of the valve 10 generally comprises the valve seats 20 and 22 and a poppet 16 that is generally axially slidably received interiorly of the poppet guide section 12 and a helical closure spring 18 that is generally received interiorly of the outlet valve housing section 14. The closure spring 18 functions to bias the poppet 16 into sealing engagement against the valve seats 20 and 22 as illustrated in FIG. 1. The poppet 16 is rotatable within the inlet valve body section 12 and is tubular in shape with uniform outside diameter. The poppet 16 comprises an upstream end 76 which displaceably and sealingly engages the valve seats 20 and 22, and a downstream end 78 which engages a spring engaging member 46. The interior bore of the poppet 16 comprises a central axially extending bore 80 which provides a part of a central axial relief bore 66. An upstream poppet end opening 82 allows flow from the annular chamber 24 to enter the poppet bore 80 directly upon flow through the orifice between the inside edge of the upstream poppet end 76 and the inside valve seat 22. The poppet 16 further defines four equiangularly displaced poppet orifices 54 that extend radially through the wall of the poppet 16 and provide radial flow passages between the relief chamber 52, exterior of the poppet 16, and the interior bore 80 of the poppet 16 such that in the open valve 10 a flow path is defined radially outside of the upstream poppet end 76 of the poppet 16, into the relief chamber 52 and thence through the poppet orifices 54. The relief chamber 52 extends axially downstream past the point of furthest downstream travel of the downstream end of the poppet orifices 54. The inside surface of the poppet guide section 12 downstream of the relief chamber 52 is of reduced inside diameter, defining an axially extending poppet guide bore 48 that is of uniform cylindrical form, coaxial with the valve 10 and poppet 16, and has an inside diameter only slightly greater than the outside diameter of the poppet 16. The cylindrical outside surface of the poppet 16 downstream of the poppet orifices 54 forms a poppet guide surface 50 which is slidably received by poppet guide bore 48. Poppet guide surface 50 is closely received within the poppet guide bore 48, leaving only so much clearance as is required to prevent binding. Poppet guide bore 48 extends downstream to the downstream end of poppet guide section 12 at point slightly upstream of position of the downstream poppet end 78 when the valve 10 is closed. The spring engaging member 46 is generally washer shaped with a central opening providing a part of the relief bore 66. A portion of the upstream surface of spring engaging member 46 is recessed to receive the downstream poppet end 78. The outside diameter of spring engaging member 46 is greater than that of poppet 16 and a clearance of 0.001 inches is provided between the outside diameter of spring engaging member 46 and the inside diameter of outlet housing section 14. By providing the clearance between spring engaging member 46 and the inside diameter of outlet housing section 14, a single chambered dash pot is created by the annular chamber defined by the upstream surface of spring engaging member 46, the outside surface of downstream poppet end 78, the inside surface of outlet housing section 14 and the downstream surface of poppet guide section 12 which forms a shoulder wherein the poppet guide bore 50 terminates. The dash pot provides opening stability and minimizes flow induced instabilities of poppet 16. The downstream end of the closure spring 18 is seated by the upstream surface of a transverse washer shaped spring retaining member 56 with a central opening and axially secured by an axially positionable retainer lug 62 threadably received within the outlet end 30 of the outlet housing section 14. When retainer lug 62 is installed, male screw threads 70 formed on the radially exterior surface of retainer lug 62 engage female screw threads 68 formed on the radially interior surface of the downstream end 30 of outlet housing section 14. The retainer lug 62 also has a central axial opening which in part forms a central axial relief bore 66 aligning with the poppet bore 80 and the center of the spring 18. The radially interior surface of the downstream end of retainer lug 62 is formed to present a hexagonal cross section, thereby comprising hexagonal socket 64. When valve 10 is in operation the central portion of hexagonal socket 64 is the final portion of relief bore 66. The purpose of hexagonal socket 64 is to receive an appropriately sized allen wrench or other hexagonal male wrench fitting (not shown). By means of applying rotational torque to such wrench, inserted into hexagonal socket 64, the retainer lug 62 is rotated and by virtue of the threading engagement of retainer lug 62 with the interior of outlet housing sections 14, retainer lug 62 is thereby axially positioned as desired. By adjusting the axial position of retainer lug 62 the compression of spring 18 is adjusted whereby the cracking and sealing pressure of valve 10 is varied as may be desired within the range allowed by the physical characteristics of spring 18.

When the force produced by the system pressure communicated to tapered inlet bore 34 and exerted against the upstream end 76 of poppet 16 exceeds the spring force of the closure spring 18, the poppet 16 is axially displaced in a downstream direction, cracking the sealing engagement between the upstream poppet end 76 and the valve seat 20 and 22, thereby opening the valve 10. Upon the opening of valve 10 the fluid media passes through the annular opening and part of the fluid media passes through the orifice opened between the outside edge of the upstream poppet end 76 and the outside valve seat 20, and another part of the fluid media passes through the orifice opened between the inside edge of the upstream poppet end 76 and valve seat 22 directly into poppet bore 80 to continue and exit the system or the valve through the relief bore 66. That portion of the fluid media passing between the outside edge of upstream poppet end 76 and the outside valve seat 20 thus enters relief chamber 52 and flows through poppet orifices 54 into the poppet bore 80, thence exiting the valve via relief bore 66. The poppet orifices 54 in the preferred embodiment are at least equal in inside area to the flow area of the orifice between the outside edge of the upstream poppet end 76 and the outside valve seat 20. The poppet 16 must be displaced a distance equal to one-half (½)of the amount by which the radius of the outside valve seat 20 exceeds the radius of the inside valve seat 22 in order for the dual orifices opened between the valve seats 20 and 22 and the upstream poppet end 76 to equal the area of the annular opening 84.

A relief flow path is provided through the valve 10 in the general direction of the broken arrows shown in FIG. 1. traversing in turn the central pin bore 40, the tapered inlet bore 34, the bores 26, the annular chamber 24, and either the upstream poppet end opening 82 or the relief chamber 52 and poppet orifices 54, through the poppet bore 80, the centers of the spring engaging member 46, the spring 18, the spring retaining member 56 and the relief bore 66 and finally exiting through the outlet end 30 of the outlet housing section 14. It should be appreciated that the optimum functioning of valve 10 requires that the area of the flow path through the valve remain relatively constant. For that reason, annular chamber 24 extends axially upstream past the downstream end of bores 26, and the fluid media is thereby allowed to exit bores 26 through the side walls of the bores 26 in addition to the downstream end of bores 26. In this manner, in the exemplar valve described herein, the flow path between bores 26 which have an aggregate transverse cross sectional interior area of 0.023 square inches and the transverse area of the annular opening 84 of 0.022 square inches is maintained without restriction. In order to achieve the proper chamfering the upstream poppet end 76 has an inside diameter of approximately 0.005 inches less than the inside diameter of inside valve seat 22 and the outside diameter of upstream poppet end 76 is approximately 0.005 inches greater than the diameter of outside valve seat 20. Accordingly, in the specific exemplar described herein the transverse area of upstream poppet end opening 82 is 0.143 square inches having an inside diameter of 0.135 inches. As there is no structural purpose for any particular limitation to the internal dimension of poppet orifices 54 are dimensioned such that their internal capacity is equal to or greater than the area of the outside orifice that opens between the outside valve seat 20 and the outside edge of upstream poppet end 76. In order to prevent poppet bore 80 from restricting flow, immediately upstream of the upstream edge of poppet orifices 54, the inside diameter of poppet 480 is increased, in the exemplar from 0.135 inches at upstream poppet end opening 82 to 0.160 inches giving poppet bore 80 a transverse interior area of 0.020 square inches which internal capacity is maintained through the relief bore 66.

The downstream surface 88 of transverse portion 74 in the immediate vicinity of valve seats 20 and 22 is flat and perpendicular to the axis of the valve 10. The outside valve seat 20 constitutes the juncture of the said downstream transverse surface 88 and the outside wall of annular chamber 24 and the inside valve seat 22 constitutes the juncture of the said downstream transverse surface 88 and the inside wall of annular chamber 24, such that both the outside valve seat 20 and the inside valve seat 22 present surfaces angled at 90 degrees to engage the inside and outside surfaces of the upstream poppet end 76. Upon final machining of valve seats 20 and 22, a small amount of material is removed, with the result that in the finished valve 10, annular opening 84 is slightly greater in transverse area than annular chamber 24. In the preferred embodiment illustrated in the drawings both the inside and the outside edges of upstream poppet end 76 are chamfered at approximately a 30 degree angle to the axis of valve 10. Upon sealing engagement of the upstream poppet end 76 with both inside and outside valve seats 20 and 22 the inside walls of the annular chamber 24, the downstream surface 88 of transverse portion 74 engages the chamfered surfaces of the upstream poppet end 24 at approximately a 60 degree angle. It is anticipated that variations in precise configuration of the sealing interface between valve seats 22 and 20, and the upstream poppet end 24 may be made without departing from the spirit and contact of the invention. Such variations could include rounded forms.

In the illustrated preferred embodiment, sections 90, 12 and 14 are constructed using an alloy recognized by the American Iron and Steel Institute as Type 416 Stainless steel, a martensitic stainless steel designated as Unified Numbering System number S41600, known as PROJECT 70 (Registered Trademark Carpenter Technology Corporation, Reading, Pa.) Type 416, being produced by Carpenter Technology Company and containing the following elements in addition to iron: Carbon: 0.15% maximum, Manganese: 1.25% maximum, Silicon: 1.00% maximum, Chromium: 12.0-14.0%, Phosphorus: 0.06% maximum, Sulfur: 0.15% minimum, and having a Rockwell hardness of C-37 after tempering and the poppet 16 is formed of an alloy recognized by the American Iron and Steel Institute as Type 420 Stainless steel, a martensitic stainless steel designated as Unified Numbering System number S42000 containing the following elements in addition to iron: Carbon: 0.15%(minimum), Manganese: 1.25% maximum, Silicon: 1.00% maximum, Chromium: 12.0-14.0%, Phosphorus: 0.06% maximum, Sulfur: 0.15% minimum, and Molybdenum: 0.60% maximum and having a Rockwell hardness of C-52 after tempering. Since those particular materials were chosen for their physical characteristics required by the intended high pressure, miniaturized, low leakage qualities of the illustrated preferred embodiment and could be varied in applications not requiring similar performance characteristics, it is anticipated that other suitable materials may be found to perform equally well under other conditions. It should be further appreciated that the foregoing pressure relief valve 10 is designed to be a relatively compact valve which in one preferred embodiment has an outside diameter in the order of 0.375 inches and an axial length that will vary depending upon the spring length. As an example of the various dimensions of the preferred embodiment, the following are the specifications of a 0.375 inch outside diameter valve of the present invention.

| | |
|---|---|
| OUTSIDE VALVE SEAT DIAMETER | .219 inches |
| INSIDE VALVE SEAT DIAMETER | .141 inches |
| AREA OF OPENING 84 | .022 square inches |
| AREA OF POPPET OPENING 82 | .014 square inches |
| AREA OF POPPET BORE 80 | .020 square inches |
| AREA OF BORES 26 | .023 square inches |
| OUTSIDE POPPET DIAMETER | .225 inches |
| POPPET OPENING STROKE | .020 inches |
| SPRING 18 (designed to crack at 1000 P.S.I) | |
| PRELOAD | 22 pounds |
| RATE | 229 pounds/inch |
| LENGTH | .725 inches |
| OUTSIDE DIAMETER | .28 inches |

In the preferred embodiment the helical closure spring 18 is selected to provide sufficient force against poppet 16 to insure adequate sealing in the system pressure ranges for which valve 10 was designed while adjustment of the actual displacement of retaining lug 62 allows for variation of the cracking pressure of valve 10. In the event a change to a significantly different pressure range is desired, the closure spring 18 would have to be selected for appropriately different characteristics. The process of selection of an appropriate spring 18 is governed in part by the size restraints of outside diameter and length although the springs of various lengths can be accommodated by appropriately varying the length of the outlet housing section 14. The first basic requirement of spring 18 is that it be stiff enough to exert a preload force against poppet 16 sufficient to counter the pressure exerted by the fluid media. Thus, the preload must equal the desired cracking pressure(P), multiplied by the area of the transverse aspect of poppet 16 exposed to inlet fluid pressure(A), i.e., Preload = PA, where A equals the area of the circle circumscribed by the outside valve seat 20 less the area of the circle circumscribed by the inside valve seat 22. Since valve 10 is fully open when the seat area A equals the opening poppet stroke times the sum of the circumferences of outside valve seat 20 and inside valve seat 22, the opening poppet stroke(T) can be readily calculated. Once the opening poppet stroke(T) is known, the desired spring rate(R) of spring 18 can be readily calculated by dividing the product of the valve seat area times the desired pressure differential(dP) between closed and fully open conditions by the opening poppet stroke(T), ie., $R = (dP)(A)/T$. The foregoing is simplified for the purpose of explanation and does not take into account the exact configuration of a particular poppet, including angle chamfer or other configuration variables that might vary the relationship of opening poppet stroke to the area of the two orifices opened between the valve seats in the inside and the outside edges of poppet 16.

It will be appreciated that the annular sealing interfaces between the valve seats 20 and 22 and the inside and outside edges of the upstream poppet end 76 are coaxial with the central axis of the valve body inlet housing section 12 and the poppet bore 80. The valve seats 20 and 22 are symmetrical about their axis, and, with the exception of the female threads 58, and the male threads 60, the inlet housing section 12 and outlet housing section 14 and the poppet 16 are bilaterally symmetrical about their axis. The preferred embodiment described and illustrated herein is specifically designed for high pressure applications in the 1,000 P.S.I. to 5,000 P.S.I. range and could function over a wider range. Use of valve 10 in lower pressure applications allowing a wider selection of materials. In high pressure applications for which the described preferred embodiment is designed, it has been found that the requisite concentricity between the valve seats 20 and 22 and the inside and outside surfaces of upstream poppet end 76 is relatively high and accordingly the respective parts must be manufactured to close tolerances. Such close tolerances would not be required in lower pressure applications or applications where in a significant amount of leakage is tolerable. In the manufacturing of valve 10, individual poppet 16 parts are matched and gauged with individual valve seat 20 and 22 parts by testing for flow in the upstream direction of less than 5 cubic feet of air per hour at 25 lbs. per square inch pressure. Such a low leakage rate requires exact machining of valve seats 20 and 22 as well as the poppet 16. In practice, the valve seats 20 and 22 and the radially exterior surface 92 of the transverse portion 74 are machined in one operation on computer controlled lathe to achieve the required concentricity and coaxial condition to within 0.0001 inches or less. Similarly, the inside and outside surfaces of the upstream poppet end 76 must be concentric and coaxial with each other and with poppet guide surface 48 to the same standard of 0.0001 inches or less, a degree of precision which requires that the surfaces be milled in one operation on a computer controlled machine. In addition, to achieve the required leakage rate the diameters of both valve seats 20 and 22 are machined to within + or −0.00005 inches of the designed dimension and the diameters of the inside and outside chamfered surfaces of upstream poppet end 76 are machined to within + or −0.00003 inches or less of the designed dimension. In addition to the precise machining to the foregoing specifications, each transverse portion 74 and poppet 16 is tested and each pair that offer the requisite fit are matched with each other to enure that the pair remains together upon final assembly of valve 10.

Valve 10 may be used to control the maximum pressure within the fluid system by employing such fluid connector as may be appropriate to provide communication between the fluid media of the system and the inlet end 28 of valve 10. As noted above, Valve 10 is specifically adapted for the insertion into the bore of a fluid system, and accordingly may be utilized by insertion such that the inlet end 28 of valve 10 is exposed to the fluid media to be controlled and the outlet end 30 of valve 10 is vented whether by exiting the system entirely or by vented to a recovery reservoir (not shown). Another usage of the valve of the present invention is as a check valve to control the direction of flow since the valve 10 will not allow flow from the outlet end 30 to the inlet end 28.

It should be further appreciated that the invention may be modified by locating the exterior mounting surface 72, tapered inlet bore 34, and tapered pin 16 assembly at the outlet end 30 of the outlet housing section 14. The modified configuration may be a useful aid to installation and inspection in certain applications.

It is further anticipated that the valve housing can be a unitary piece not constructed of separable sections as in the described embodiment. The main benefits of a sectioned valve body are the capability of changing spring lengths when required to change cracking pressure and the manufacturing convenience in the ease of access to valve seats 20 and 22 for machining purposes. In addition, alternative methods of securing valve 10 in bore of a fluid system are available and have been utilized without departing from the spirit of the invention. Further, it may be anticipated that the valve of the present invention could be mounted on and secured to a relief orifice rather than being installed within a bore, although modification of wall strengthening may be required as well as adaptations to accommodate alternative means of securing the valve to the orifice.

While preferred embodiments of the foregoing invention have been set forth for purposes of illustration, the foregoing description should not be deemed a limitation of the invention herein. Accordingly, various modifications, adaptations and alternatives may occur to one skilled in the art without departing from the spirit and the scope of the present invention.

What is claimed is:

1. A fluid control valve comprising;

(A) housing means for forming a generally axially extending body defining an axially extending flow path;
    (B) dual concentric valve seat means comprising opposing inside and outside valve seat means which define an opening comprising a section of the flow path through the valve;
    (C) generally sleeve-like poppet means slidably received within said body, said poppet means having an upstream end equal to or greater than the opening in transverse aspect, having inside and outside surfaces and an axially extending flow passage defined by the inside surface of at least one orifice through the poppet wall for providing fluid communication between the exterior of said poppet means and the flow passage within the poppet means and being sealingly engageable with said valve seat means to prevent the flow of fluid through the opening and being axially displacable from said valve seat means to permit the flow of fluid through the opening and the fluid media passes through either the gap between the inside surface of the upstream end of said poppet means and the inside valve seat means or the gap between the outside surface of the upstream end of said poppet means and the outside valve seat means and thence into the poppet flow passage; and
    (D) biasing means for biasing said poppet means against said valve seat means in a first upstream axial direction so that said poppet means sealingly engages said valve seat means unless and until the force exerted against said poppet by the pressure of the fluid media in the second downstream axial direction exceeds the opposing force exerted against the poppet by the biasing means axially displacing said poppet from said valve seat means in said second axial direction and allowing flow through the valve.

2. The fluid control valve of claim 1 wherein the valve seat means and the opening defined by the valve seat means are annular and the poppet means is tubular, presenting an annular upstream end with an inside diameter slightly less than the inside diameter of the opening and an outside diameter slightly greater than the outside diameter of the opening.

3. The fluid control valve of claim 2 wherein a portion of the outside surface of the poppet downstream of the poppet wall orifice is closely received by interior surface of the valve body such that substantially all of the fluid media enters the flow passage inside of the poppet prior to exiting the valve.

4. The fluid control valve of claim 3 wherein the poppet comprises a plurality of angularly displaced poppet wall orifices and the inside diameter of said poppet is increased from a point immediately upstream of said poppet wall orifices to the downstream poppet end.

5. The fluid control valve of claim 4 wherein the inside and outside edges of said upstream poppet end are chamfered for engaging said valve seat means along two generally annular sealing interfaces.

6. The fluid control valve of claim 5 further comprising an axially positionable lug threadably received within said housing and wherein said biasing means comprises a spring compressed between said poppet means and said lug.

7. The fluid control valve of claim 6 further comprising means for damping the axial movement of the poppet means.

8. The fluid control valve of claim 7 wherein the damping means comprises a dashpot means comprising a washer positioned between the spring and the downstream end of the poppet and having a greater radially outside diameter than the downstream poppet end and proximate to the washer the inside diameter of the valve body is increased to exceed the outside diameter of the washer such that the interior surface of the valve body, the exterior surface of the downstream end of the poppet and the upstream surface of the washer form an annular dashpot chamber with means for providing fluid communication between the chamber and the flow path.

9. The fluid control valve of claim 8 wherein the means for fluid communication between the dashpot chamber and the flow path comprises an annular gap between the outside radial diameter of the washer and the inside diameter of the valve body proximate to the washer.

10. The fluid control valve of claim 9 wherein the washer comprises a stepped upstream surface providing an axially recessed area of outside diameter equal to the outside diameter of the downstream end of the poppet such that the downstream end of the poppet fits into the washer recess securing the washer against radial movement relative to the poppet and wherein the downstream surface of the washer engages the closure spring biasing means.

11. The fluid control valve of claim 10 wherein the housing means comprises a main body section and a valve seat section with a downstream end comprising the valve seats and that is of lesser radial outside diameter than the inside radial diameter of the adjacent portion of the main valve body section.

12. A fluid control valve comprising:
(A) housing means for forming a generally axially extending body defining an axially extending flow path and having a generally cylindrical outer surface adapted for installation within the bore of a fluid conduit;
(B) dual concentric valve seat means comprising opposing inside and outside valve seat means which define an annular opening comprising a section of the flow path through the valve;
(C) generally tubular poppet means slidably received within said body, said poppet means having an annular upstream end with an inside diameter slightly less than the inside diameter of the opening and an outside diameter slightly greater than the outside diameter of the opening, having inside and outside surfaces and an axially extending flow passage defined by the inside surface and at least one orifice through the poppet wall for providing fluid communication between the exterior of said poppet means and the flow passage within the poppet means and being sealingly engageable with said valve seat means to prevent the flow of fluid through the opening and being axially displacable from said valve seat means to permit the flow of fluid through the opening and the fluid media passes through either the gap between the inside surface of the upstream end of said poppet means and the inside valve seat means or the gap between the outside surface of the upstream end of said poppet means and the outside valve seat means and thence into the poppet flow passage;
(D) biasing means for biasing said poppet means against said valve seat means in a first upstream axial direction so that said poppet means sealingly engages said valve seat means unless and until the force exerted against said poppet by the pressure of the fluid media in the second downstream axial direction exceeds the opposing force exerted against the poppet by the biasing means axially displacing said poppet from said valve seat means in said second axial direction and allowing flow through the valve; and
(E) dashpot means for damping the axial movement of the poppet.

13. The fluid control valve of claim 12 wherein the dashpot means comprises a washer positioned between the spring and the downstream end of the poppet and having a greater radiall outside diameter than the downstream end and proximate to the washer the inside diameter of the valve body is increased to exceed the outside diameter of the washer such that the interior surface of the valve body, the exterior surface of the downstream end of the poppet and the upstream surface of the washer form an annular dashpot chamber with means for providing fluid communication between the chamber and the flow path.

14. The fluid control valve of claim 13 wherein a portion of the outside surface of the poppet downstream of the poppet wall orifice is closely received by interior surface of the valve body such that substantially all of the fluid media enters the flow passage inside of the poppet prior to exiting the valve.

15. The fluid control valve of claim 14 wherein the poppet comprises a plurality of angularly displaced poppet wall orifices and the inside diameter of said poppet is increased from a point immediately upstream of said poppet orifices to the downstream poppet end.

16. The fluid control valve of claim 15 wherein the inside and outside edges of said upstream poppet end are chamfered for engaging said valve seat means along two generally annular sealing interfaces.

17. The fluid control valve of claim 16 further comprising an axially positionable lug threadably received within said housing and wherein said biasing means comprises a spring compressed between said poppet means and said lug.

18. The fluid control valve of claim 17 wherein the means for fluid communication between the dashpot chamber and the flow path comprises an annular gap between the outside radial diameter of the washer and the inside diameter of the valve body proximate to the washer.

19. The fluid control valve of claim 18 wherein the washer comprises a stepped upstream surface providing an axially recessed area of outside diameter equal to the outside diameter of the downstream end of the poppet such that the downstream end of the poppet fits into the washer recess securing the washer against radial movement relative to the poppet and wherein the downstream surface of the washer engages the closure spring biasing means.

20. The fluid control valve of claim 19 wherein the housing means comprises a main body section and a valve seat section with a downstream end comprising the valve seats and that is of lesser radial outside diameter than the inside radial diameter of the adjacent portion of the main valve body section.

* * * * *

UNITED STATES PATENT AND TRADEMARK OFFICE
CERTIFICATE OF CORRECTION

PATENT NO. : 5,007,454

DATED : 04/16/1991

INVENTOR(S) : Leighton Lee II

It is certified that error appears in the above-identified patent and that said Letters Patent is hereby corrected as shown below:

The sheets of Drawing consisting of 1 of 4 should be deleted to be replaced with the sheets of drawings consisting of Figs. 1-4 as shown on the attached pages.

Signed and Sealed this

Sixth Day of October, 1992

Attest:

DOUGLAS B. COMER

*Attesting Officer*    Acting Commissioner of Patents and Trademarks